United States Patent [19]

Astiz et al.

[11] Patent Number: 5,918,012
[45] Date of Patent: *Jun. 29, 1999

[54] HYPERLINKING TIME-BASED DATA FILES

[75] Inventors: Paul Astiz, North Bethesda, Md.; Fil Feit, Annandale, Va.

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,224

[22] Filed: Mar. 29, 1996

[51] Int. Cl.$^6$ ..................................... H04L 12/28
[52] U.S. Cl. .............. 395/200.47; 395/200.33; 395/200.48; 345/335
[58] Field of Search ............ 395/200.48, 200.33, 395/200.47, 200.34, 200.56, 200.61, 188, 146, 761; 345/121, 335; 707/501

[56] References Cited

U.S. PATENT DOCUMENTS

| | | | |
|---|---|---|---|
| 5,227,863 | 7/1993 | Bilbrey et al. | 348/578 |
| 5,481,312 | 1/1996 | Cash et al. | 348/845.2 |
| 5,530,852 | 6/1996 | Meske, Jr. et al. | 395/200.36 |
| 5,555,354 | 9/1996 | Strasnick et al. | 345/427 |
| 5,563,648 | 10/1996 | Menand et al. | 348/13 |
| 5,572,643 | 11/1996 | Judson | 395/200.48 |
| 5,586,264 | 12/1996 | Belknap et al. | 395/200.49 |
| 5,617,539 | 4/1997 | Ludwig et al. | 395/200.35 |
| 5,623,589 | 4/1997 | Needham et al. | 345/356 |
| 5,627,936 | 5/1997 | Prasad et al. | 386/96 |
| 5,633,683 | 5/1997 | Rosengren et al. | 348/385 |
| 5,633,810 | 5/1997 | Mandal et al. | 370/431 |
| 5,634,064 | 5/1997 | Warnock et al. | 707/513 |
| 5,649,186 | 7/1997 | Ferguson | 707/10 |

FOREIGN PATENT DOCUMENTS

| | | |
|---|---|---|
| 0 457 445 | 11/1991 | European Pat. Off. . |
| 596 823 A2 | 5/1994 | European Pat. Off. . |
| 2 288 507 | 10/1995 | European Pat. Off. . |
| 93/10495 | 5/1993 | WIPO . |

OTHER PUBLICATIONS

Using Netscape 2 by Mark R. Brown, 1995 publication, pp. 396–398,404–409,414–422,478–490.

Building a Hypermedia information system on the internet by Lau, 1994 IEEE publication, pp. 192–197.

The networked video jukebox by Crutcher et al., Apr. 1994 IEEE publication, pp. 105–120.

*Computer Networks International Journal Of Distribution Informatique*, vol. 27, No. 6, Apr. 1996, Amsterdam, Netherlands, pp. 1075–1087, XP000579907, S. Mukherjea et al., "Visualizing the World–Wide Web with the Navigational View Builder".

(List continued on next page.)

*Primary Examiner*—William M. Treat
*Assistant Examiner*—Zarni Maung
*Attorney, Agent, or Firm*—Nixon & Vanderhye pc

[57] ABSTRACT

A network data processing system is disclosed that uses novel methods and apparatus to hyperlink from full motion videos. The present invention can be used with any standard video file by adding a header identifying a video map location and a script location identifying where the hyperlinks are associated with the video file for any given frame. The present invention includes a new viewer that reads the header and issues the header information, X-coordinate, Y-coordinate, and time coordinate for a particular hyperlink selection made by a user via a computer pointing device. An HTTP Server and video script then operate in conjunction to obtain the corresponding map and identify a network address associated with the coordinate information provided by the viewer.

20 Claims, 8 Drawing Sheets

OTHER PUBLICATIONS

Feinleib, D., "AVI Files With Hot Spots," Technical Articles: Multimeda–Microsoft Development Library, pp. 1–6.

Burrill et al., "Time Varying Sensitive Regions In Dynamic Multimedia Objects: A Pragmatic Approach To Content Based Retrieval From Video"; Information and Software Technology, vol. 36, No. 4, Jan. 1, 1994, pp. 213–251, 217 and 219.

"Multimedia Hypervideo Llnks For Full Motion VLdeos," IBM Technical Disclosure Bulletin, vol. 37, No. 4A, Apr. 1, 1994, p. 95.

Lowe et al., "HyperImages: Using Object Recognition For Navigation Through Images In Multimedia," Proceedings Of The SPIE, vol. 2420, Jan. 1, 1995, pp. 418–429.

Gunnar Liestol, "Aesthetic And Rhetorical Aspects Of Linking Video In Hypermedia,"ACM European Conference on Hypermedia Technology, Proceedings, Sep. 1, 1994, pp. 217–223.

| BTV HEADER | |
|---|---|
| CGI URL | [SCRIPT NAME] |
| MAP LOCATION | [MAP NAME] |
| AVI FILE | C:\PROJECTS\VIDEOHL\VB\ZOOTWO.AVI |

BVT OPTIONS

- [X] ALLOW LOCAL SAVE
- [X] ALLOW STOPPING
- [X] ALLOW PAUSE
- [X] PAUSE AFTER FIRST CLICK
- [X] START ON RECEIPT

- [ ] IGNORE FIRST [ ] CLICKS
- STORE AND SEND [1] CLICKS

- ( ) DO NOT LOOP [PLAY ONCE]
- ( ) LOOP CONTINUOUSLY
- ( ) LOOP [ ] TIME [s]

[SAVE AS...]  [CLOSE]

*FIG. 9*

HYPERLINKING TIME-BASED DATA FILES

RELATED APPLICATIONS

This application is related to copending, commonly assigned U.S. patent application Ser. No. 08/622,856, filed on Mar. 29, 1996, entitled "WORLD WIDE WEB NAVIGATIONAL MAPPING SYSTEM AND METHOD," pending.

BACKGROUND OF THE INVENTION

Internet access is increasingly based on browser technology. The internet is a computer network built upon the network of telephone lines that exist worldwide. Computers connected to the internet can exchange information with any other connected computer. FIG. 1 is a simplified rendition of the internet. At the heart of the internet is the so-called "Internet Backbone," at the center of FIG. 1. The backbone is founded on the set of major telephone conduits that exist across the world. These are the long-distance telephone provider's conduits designed to move large volumes of data traffic quickly. For example, the triangle in the center of FIG. 1 may represent the three major telephone conduits that exist between Washington, Los Angeles, and New York.

Each of the major conduits terminates at a router. The routers are large, fast switching systems that sort the large volume of incoming data for local routing, much as large Post Offices sort mail for local delivery. Each router is connected to additional, more local, routers. Some of the local routers are called "points of presence" (or "POPs") and are designed to bring backbone access to more localized regions. Thus, for example, the backbone termination router that exists in Washington may have point of presence routers connected in Baltimore, Alexandria, etc. A backbone router can connect as many point of presence routers as the constraints of its switching systems and the capacity of the backbone will permit.

In addition to point of presence routers, Commercial Internet Exchanges (CIX in FIG. 1) and Global Internet Exchanges (GIX in FIG. 1) also connect to the backbone routers. These exchanges transfer data between internet service providers nationally and internationally. When data originates on one U.S. internet service provider with a destination on another U.S. internet service provider, the data first routes to the Commercial Internet Exchange where it makes the transfer between providers. A similar situation occurs when data originates in one country, bound for another country. The data first passes through the Global Internet Exchange where it is transferred from one provider to another.

In theory, still further, even more localized, point of presence routers could connect off of the point of presence routers shown in FIG. 1. Typically, however, the point of presence routers (POP1, POP2, POP3, etc.) provide the direct local connection point for various types of computers to connect to the internet.

A common method in which personal home computers connect to the point of presence is through a local internet carrier. As shown at POP2 in FIG. 1, the local internet carrier obtains a direct line to the POP2, and then provides a modem connection for home computer users to dial for connection. When the home computer connects to the modem of the local internet carrier, the carrier switches the computer through to the POP2, which in turn switches it onto the internet backbone.

Another method of connecting computers to the internet is by direct connection through a LAN system to the point of presence. This example is shown as LAN#1 and LAN#2 connections to, respectively, POP1 and POP2. Specifically, the LAN connects to the point of presence through a leased data line (dedicated phone connection). The computers (PCs in FIG. 1) are connected to the LAN and receive and transmit data to the point of presence through the control of the LAN. Also attached to the LAN are a variety of different servers, three of which are shown in FIG. 1. The File Server connects to the LAN and contains the common data files used by the PCs, LAN, and other Servers. The HTTP Server processes incoming and outgoing data to and from the internet by assuring that the data is written and received according to certain internet communication protocols, called the HyperText Transport Protocol (HTTP). The Electronic Mail Server processes E-Mail data that is written to or received from the internet.

As shown in FIG. 1, the internet provides a conduit essentially interconnecting every computer on the internet with every other computer on the internet. LAN#1, for example, can provide certain data (called internet pages) from its File Server to the HTTP server to make the pages available to any other computer on the internet. An HTTP Server that makes internet pages available on the internet usually includes a so-called "home page," which is the starting point for outside users to navigate through the underlying internet pages serviced by the HTTP Server. When a user, such as the user of the "Home PC" (emanating from POP2 in FIG. 1), wants to view a home page, such as LAN#1's home page, it can do so by calling for the data from LAN#1. In response, LAN#1 pulls the internet page data from its File Server and instructs its HTTP Server to write the data, addressed to Home PC, onto the internet. The data travels from the local ISDN to the POP1, through the internet backbone (and respective routers), through the CIX or IIX (if necessary), through POP2, through the local internet carrier, and into the modem of the Home PC. The request for the data from the Home PC to the LAN#1, of course, travels along the opposite path.

To insure that data is sent to and received by the appropriate systems on the internet, every "device" (i.e., PC workstation, HTTP Server, File Server, etc.), when it is communicating on the internet, has assigned to it a unique address, called an IP Address. The IP Address can be analogized to a personal phone number that can be called by another phone to make a connection (through a series of telephone routers) between them. The IP Address is presently a sixteen bit binary address, which is fine for computers to read, but is cumbersome for a human user to memorize or use. As a result, the IP Addresses are assigned mnemonics to make them more "user-friendly." One mnemonics of particular importance is the "host name," which is the IP Address for any HTTP where a home internet page resides (as a result of convention, the host name is usually assigned the mnemonics "WWW"). The IP Address for the internet site (for example, the LAN) supporting the HTTP Server is called a "domain name."

FIG. 2 shows an address line written in the standard protocol used by internet components to address each other. The protocol is referred to as a "Uniform Resource Locator" (URL) and this terminology appears as the opening argument in the address of FIG. 2. In FIG. 2, the Uniform Resource Locator indicates that the request is for "HTTP" formatted data (i.e., a internet page as opposed to, for example, an e-mail message). The home page for the data resides on the "www" HTTP Server on the "ucla.edu" LAN (or domain). The name of the file (to be found most likely in the File Server supported by the ucla.edu LAN) is "homepage.html."

If, for example, the ucla.edu LAN is LAN#1 of FIG. 1 and a user of a PC at LAN#2 wants to view the "homepage.html" file, the user sends the address shown in FIG. 2 to LAN#1 through the internet channels shown in FIG. 1. Upon receipt of the address, LAN#1 returns to the user the "homepage-.htl" file through a reverse path of the internet channels.

Once a user has received an "HTML" formatted file (any internet page), the text of the file may prompt the user to request additional information contained in different internet page files. The prompts are referred to as "hypertext" and usually show up on a home page (or other internet page) in a different color than normal text, thus distinguishing them as hypertext links. As an example, a user requesting a local zoo homepage may see several different hypertext links to files containing information on various animals at the zoo, a map of the zoo, operating times, etc. By clicking a computer pointer on the prompt, the user can automatically move from a current internet page to a new one.

The computer pointing device can be a "mouse," a touchscreen, a remote control, a light pen, etc.

When the user clicks on a hypertext link, the user's data processor records the position of the computer pointer when the click occurred. The processor then uses a look-up table of x-y coordinates versus URLs to identify a new URL address assigned to the position of the computer pointer. The URL address may be serviced by the same domain or a different one, depending on the information contained in the look-up table. When clicked, a browser (discussed in more detail below) requests a connection to the HTTP Server hosting the file, and it also requests from the HTTP Server the file identified by the URL. Once the HTTP Server accepts the connection requested by the browser, the HTTP Server transmits back to the browser the requested file. Once the browser receives the requested file, it delivers or presents the content of the file to the requesting user.

Hypertext links can be assigned to textual information, such as, in the example of the zoo page, assigning links to the words "monkey" and "elephant" appearing on the internet page screen. They can also be assigned to photographs on the internet page screen, such as on a picture of a monkey or an elephant. Then, by placing the pointing device on the text or picture and clicking the pointing device, the user is taken from a current internet page to a new internet page assigned to the particular text or picture selected. Thus, for example, clicking on the elephant may take a user from a local zoo page to a page supported by a elephant conservation association or, alternatively, to another local zoo page containing pictures of the elephants kept at the zoo. In either the text or picture examples, the internet page is embedded with specially assigned "hot spots," located at x-y coordinates on the page. When the browser detects a pointing device click over a "hotspot", or linked location, it finds the associated URL and sends the filename portion of the URL to the server located at the domain name portion of the URL. A picture may further be flagged as having a "map" associated with it. If it does, the relative coordinates of the click within the picture are sent to the server as well. The server then determines which page to return, based on the location of the click.

Browsers are used by the internet user at the local PC to convert information received from the HTTP Server into a format that can be displayed by the browser on the video screen (or through the audio speakers) of the PC. The browser is thus an application program that runs on a local PC and acts as a translator of HTML information to be presentable at the local PC. Several different commercial browsers are available that can be incorporated into the present invention, including, for example, the Netscape Navigator browser.

The browser is also used to recognize clicks on the screen made by a user with the computer pointing device. When the user positions the computer pointing device on a portion of the text of the screen associated with a hypertext link, the browser recognizes the user's action as a request to get a file from a web site identified by the URL thereby obtaining new data files from an IP address on the internet. Then, as discussed above, when the data is returned from the HTTP Server, the server delivers the data to the browser, which translates it into a format presentable at the PC and presents it to the user.

On occasion, the information that is returned from the HTTP Server (and subsequently to the browser) is of a type not presentable by the particular browser being used. This occurs, for example, when video data is returned to the browser and the browser does not have the appropriate application software to display the video to the PC user. In these instances, the browser enlists a helper application resident on the PC to display the incoming data. For example, when the browser receives video data from the internet, it frequently opens a viewer, which appears as a window on the screen of the PC user, which will process the incoming video data through the browser and display the video to the user on the PC screen.

SUMMARY OF THE INVENTION

Internet pages are not limited to text and picture information, but can include full-motion video, audio, and other time-changing data. Traditionally, these types of data are presented to a user via a "viewer" assigned specifically to the task of presenting the time-changing data to the user. Thus, for example, viewers are available for displaying video and playing audio.

Full-motion video/audio data files are available on the internet and are usually obtained by a user's Browser program, which automatically opens a viewer program to present the information (i.e., play the video/audio) to the user. Thus, for example, if a user requests a full-motion video file from a site on the internet, the browser will receive the file from the HTTP Server, open a video viewer, and download the video file to the video viewer for display on the screen of the user's data processor (PC). The browser knows which viewer is needed for a particular file based on a Multipurpose Internet Mail Extension (MIME) extension attached to the file name.

Hyperlinks are not embedded in full motion video data, like they are in text and picture data, since to do so would require reworking (for example, re-editing) a video to superimpose the hot spot locations onto the video data. The present invention provides hyperlinks on full-motion video, real-time audio or any other time-based data, without reworking the data file. The hyperlinks associated with the present time-based data files are particularly suitable for use on the internet since they permit a user to view a time-based data file (such as a video), click on a portion of the display, and be moved automatically to another, related, internet page.

For simplicity, this disclosure shall hereafter refer to "video" data, although the artisan will be able to appreciate that any time-based data can be substituted for the video data described. For instance, a still image, an image representing buttons, etc. can be used as a hot spot area, along with a sound file. When the image is clicked, the time into the sound file is sent, along with the x and y position, to the server.

According to the present invention, when a user positions a computer pointing device on a moving video and clicks the pointer, data representing the position of the pointer (x- and y- coordinates) and data representing the time of the click are recorded. A three-dimensional lookup table is then consulted to determine which URL is to be issued for the recorded x-, y-, and time dimensions.

Video data files used by the present invention are not altered in their video data content, but include a header identifying the video data as conforming to the present invention. Any standard, video data can be converted into video data according to the present invention simply by adding the header referred to above and described in greater detail below. A data file that has been converted to include the header is referred to herein as a BTV file since these files have been assigned a file name MIME suffix of ".btv" as a convention.

The header also tells the viewer a location where it can find the script or program needed to use the look-up table. It also identifies the location of the three-dimensional lookup table (also known as the map) associated with the video file and the location of the standard video data (preferably in .avi format, although any other video format can be used) to be displayed on the viewer.

BRIEF DESCRIPTION OF THE DRAWINGS

The purpose and advantages gained by the present invention will be understood by careful study of the following detailed description of the presently preferred embodiment with particular reference to the accompanying drawings.

FIG. 9 is a .BTV file header utility according to one aspect of the invention.

DETAILED DESCRIPTION OF THE PRESENTLY PREFERRED EMBODIMENT

Figure 1:
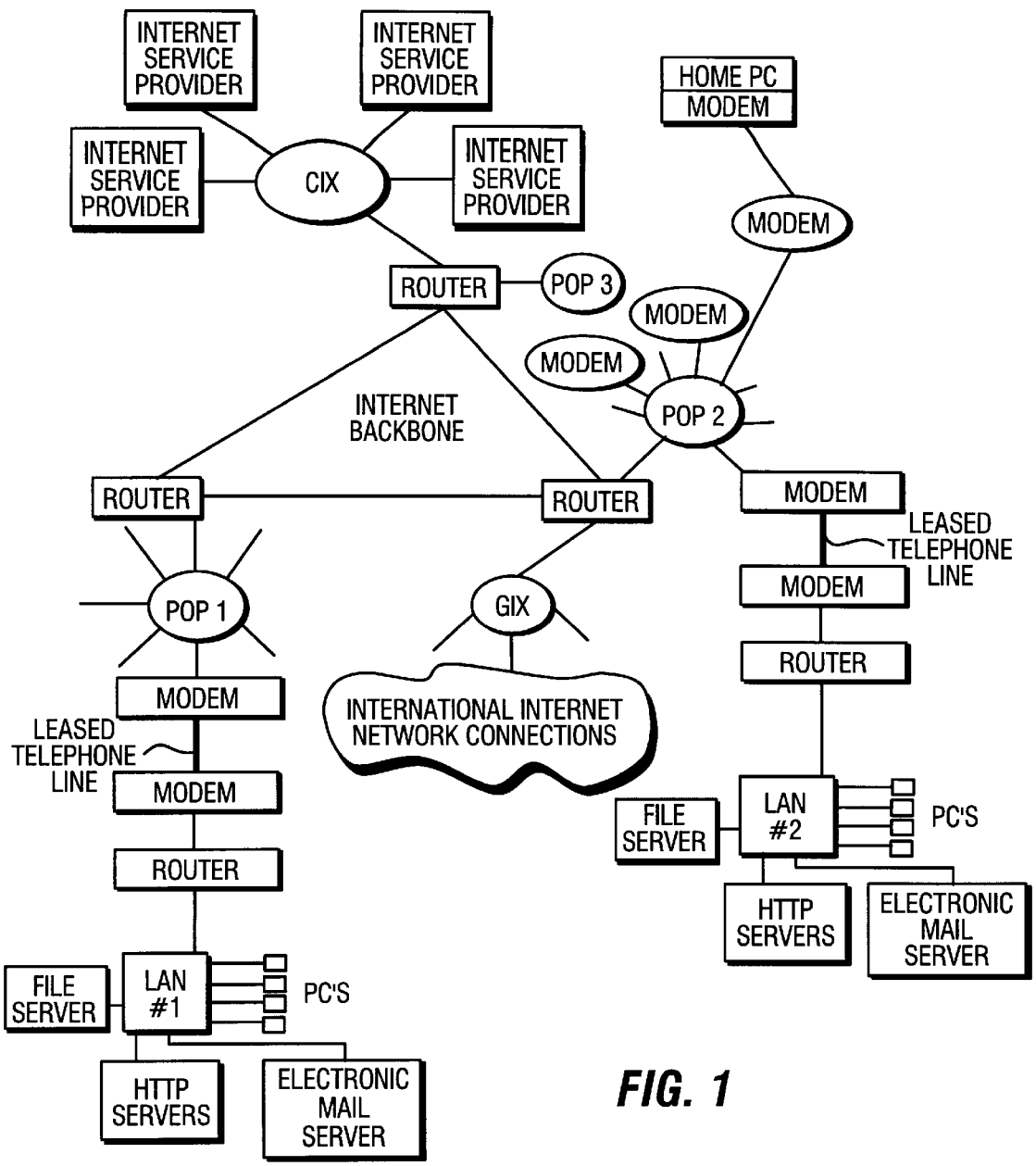
FIG. 1 is a schematic diagram of an internet network.
Figure 2:
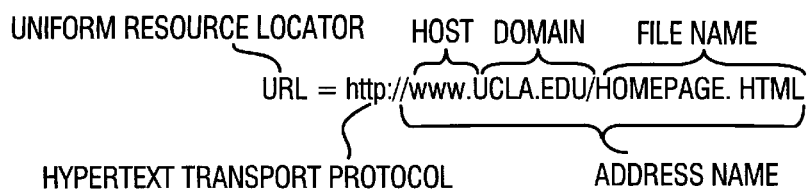
FIG. 2 is a internet address breakdown.
Figure 3:
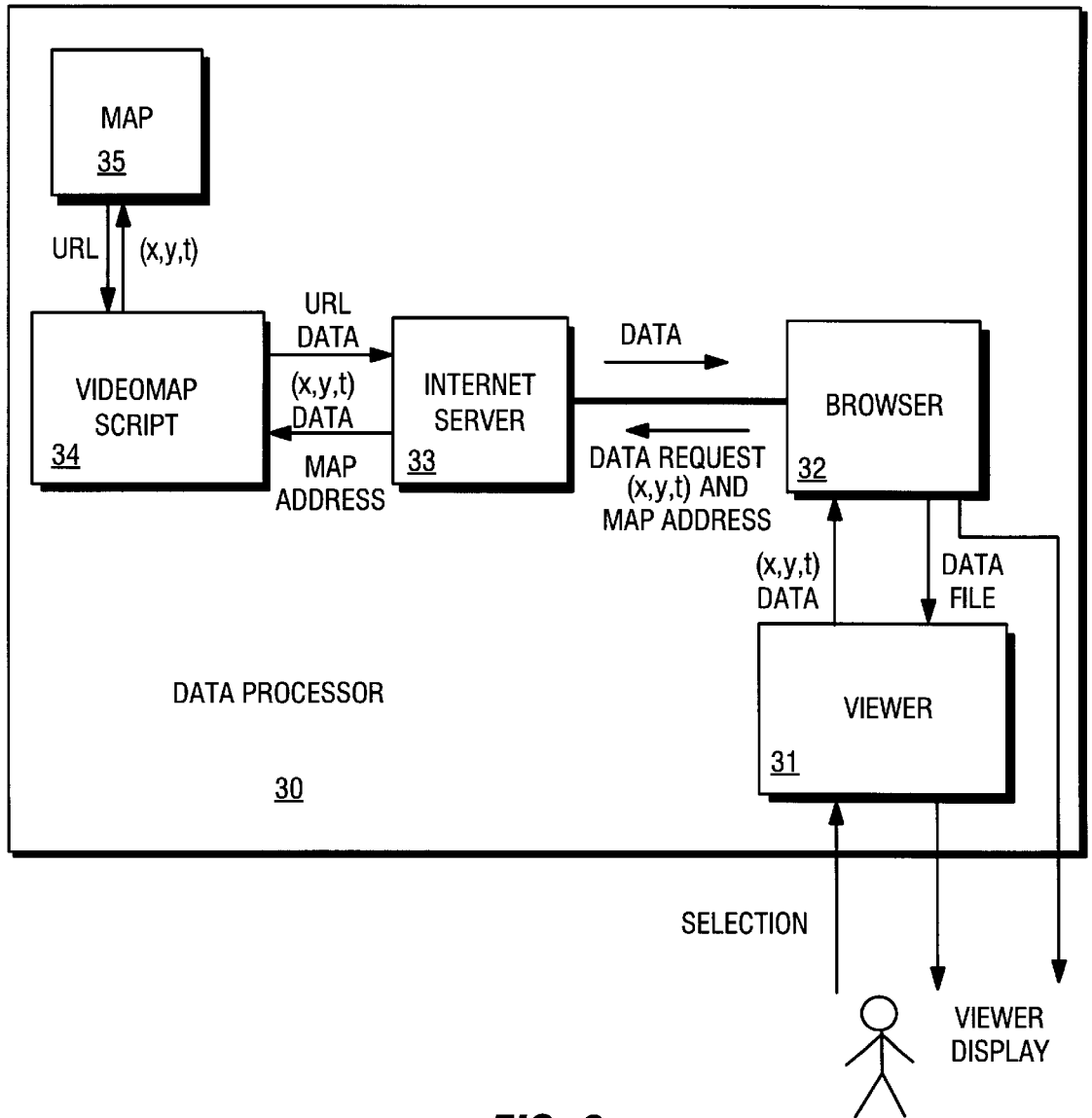
FIG. 3 is a schematic diagram of one embodiment of the present invention.

The present invention can be realized in a variety of different ways, including in the several embodiments described with respect to FIGS. 3 through 9 in the context of the network shown in FIG. 1. The embodiment of FIG. 3 has a data processor 30, which can be any standard PC having a microprocessor, memory, a video screen, etc., and including a variety of software components described below. Alternatively, the data processor 30 may be divided into multiple separate hardware components rather than the single hardware component shown in FIG. 3. In the embodiment of FIG. 3, the viewer 31 and the browser 32 are the principal connections between the user and the information on the network (such as that shown in FIG. 1). The present invention is described in connection with the internet of FIG. 1 but can be applied to any network of devices, public or private.

In the internet embodiment, in particular, the browser 32 receives information from the internet network via the HTTP Server 33 and translates that data from the language used on the internet (called the HTML data format) into a screen display that the user can recognize. When the browser 32 receives HTML data from the HTTP Server 33 in a MIME format that requires the browser 32 to enlist the assistance of a viewer 31 to display the information to the user, the browser 32 initiates the opening of the viewer 31 and the downloading of the data file to the viewer 31, as shown in FIG. 3. With the data file from the browser 32, the viewer 31 then interprets the data and translates it into a format that the user can sense. Thus, for example, the browser 32 may enlist the assistance of the viewer 31 to play a video by opening the viewer 31 and downloading the HTML video data file to the viewer 31. The viewer 31 then translates the video data file into a video screen that the user can watch.

Figure 4:
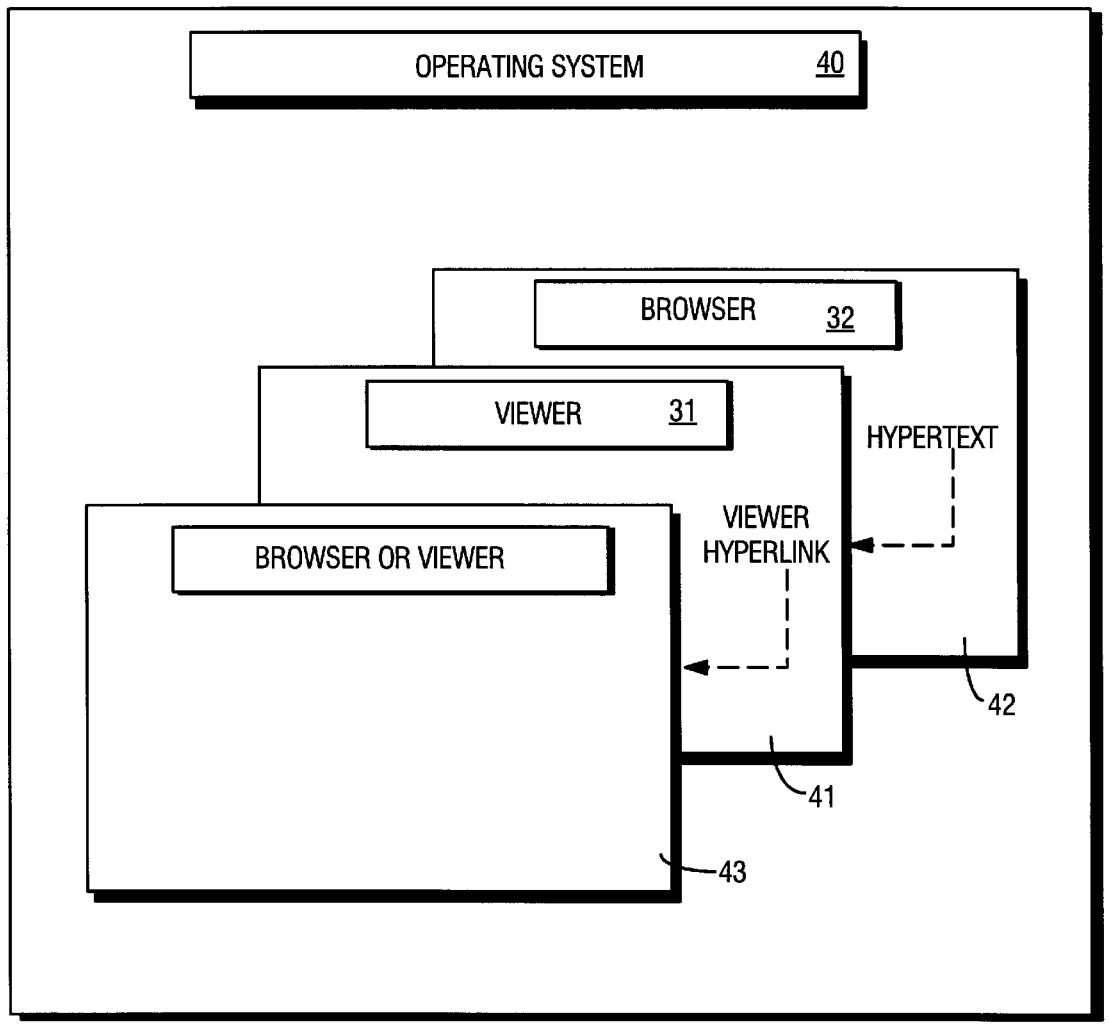
FIG. 4 is a schematic diagram of the operating system and video screen according to the embodiment of FIG. 3.

In the embodiment of the present invention shown in FIG. 3, the viewer 31 is a specialized viewer that will accept and process BTV MIME files. The BTV MIME file is a video data file (preferably converted from a .avi MIME format) which permits the user to make hyperlink selections in both position and time domains from full motion video that the user watches. FIG. 4 shows the operating system 40, together with the viewer 31 and browser 32. Also shown in FIG. 4 are the screens that the user would see when using the browser 32 and viewer 31 in accordance with one aspect of the present invention. In particular, the browser 32 is software, and prepares as part of its routine a screen 42 displaying information for the user to see. Similarly, the viewer 31 is also software and prepares a screen 41 for the user to see.

In the embodiment shown in FIG. 4, the screen 42 of the browser 32 includes a hypertext word that, when clicked on by the user, causes the browser 32 to issue a URL request to the HTTP Server to obtain a data file from some IP address on the internet shown in FIG. 1. In the embodiment of FIG. 4, the URL assigned to the hypertext in the screen 42 of the browser 32 causes a video data file to be retrieved. When the video data file is received by the browser 32 from the HTTP Server 33 (FIG. 3 or FIG. 1), the browser 32 recognizes from the MIME (in this case the .BTV MIME), that it needs to open the BTV viewer 31 and download the BTV data file to the viewer 31 for display to the user on the screen 41.

Once the viewer 31 has the BTV file and is displaying it to the viewer, the user is then able to point and click onto portions of the full motion video, which causes the viewer 31 to issue a URL address to the browser, which requests the filename specified in the URL from the domain in the URL. It also passes on the x, y, and t information (described in more detail below). When the viewer 31 receives the requested data file, the viewer 31 then opens either another browser or another viewer (depending on the MIME type of the hyperlinked data received) to display the data to the user. This display is shown as linked screen 43 in FIG. 4.

The present viewers thus display the data requested by the browser, and in addition, have the processing capabilities necessary to permit a user to hyperlink from some subject matter on the viewer screen 41 to other data from another URL file to be displayed on linked screen 43. A description of how the viewer 31 operates to permit the user to hyperlink from a screen 41 to a screen 43 follows.

In reference again to FIG. 3, when the user points the pointing device at a particular portion of the video playing on the viewer screen 41 of the viewer 31 ("selection" in FIG. 3), the viewer 31 sends so-called (x,y,t) data to the browser 32 for processing into a URL code. Typically when a user positions a computer pointing device at a portion of a browser screen (such as text or a still image) the browser uses the X and Y coordinates of the pointing device to determine that the user has requested additional data originating at a particular URL location. With the viewer 31 of the present invention, however, the video pictures are moving and changing over time causing the X and Y coordinate system to be insufficient for user selections of time-based data files. This happens, for example, because a screen which is showing one subject matter at one moment (on which the user may wish to click and move to a data file related to that particularly displayed subject matter) will be different than the video display on the viewer screen 41 that occurs sometime after the original display. As a result, the user who clicks on an X-Y coordinate at time $t_0$ will be clicking on a different picture (or text) than if the user clicks at the exact same X-Y coordinates at a later time $t_1$.

To accommodate the time element of the video display 41 when the user clicks on a particular object, the viewer 31 sends to the browser 32 as part of the (x,y,t) data, the X position of the click, the Y position of the click, and a time element when the click occurred. With video data, the time element is most easily obtained by recording the frame number of the video that is playing. In this embodiment, when the user clicks on a particular spot of the video display, the viewer 31 sends $X_0$, $Y_0$, and $t_0$ information to the browser 32. If, the user then clicks on exactly the same position on the screen 41 of the viewer 31 at a time $t_1$ later, the viewer 31 would then send $X_0$, $Y_0$, and $t_1$ information to the browser 32. In the audio embodiment, the time coordinate may be a two-dimensional item: a track number and a time from the start of the track. Of course, it might be an actual time, from some fixed starting point (such as midnight) or it may be a variable starting time (such as the beginning of a selection).

The (x,y,t) data sent by the viewer 31 to the browser 32 also includes two additional pieces of information: the location of a CGI script file and the location of a image map file. The viewer 31 obtains these two pieces of information from the header on the .BTV formatted video data which it receives from the browser 32. Alternatively, the browser 32 itself can obtain the CGI scripted file and the video map file from the .BTV header.

The header, from which the viewer 31 obtains the script and map files, is all that is added to a video file to convert it into a .BTV file. The present invention is not limited to any particular video file format, but preferably, the format is the .AVI format. In addition, because the present invention adds just a header to the video data, virtually any data format can be used. A typical header added to a .AVI formatted video file to convert it into a .BTV video file is as follows:

START-BTV
VER 1.0
URL http://host.domain/cgi-script
VHL /c/director/image.map
END-BTV Each of the items between the START and END statements are mandatory attachments to the .AVI file to convert it to a .BTV file. Additional optional information, such as that collected via the interface shown in FIG. 9 (and described in greater detail below), can be included in the heading. The VER statement identifies the current program version. The URL statement identifies the location and name of the CGI script that will coordinate the X-Y coordinates, time coordinates and image map to return an associated URL address. The VHL statement is the location and name of the image map. The URL and VHL statements are the two additional pieces of information that the viewer 31 sends to the browser 32, in addition to the position and time data corresponding to the user's selection.

Once a user makes a selection, the browser 32 then transmits the VHL (from the header), X and Y coordinates, and time coordinate to the HTTP Server 33 specified in the CGI URL (from the header). The HTTP Server 33 uses the URL statement to retrieve the script file 34 from a local file server. The video map script 34 then uses the VHL statement to locate and load the appropriate video map 35 identified by the viewer 31 when the user made the selection. The video map script 34 is preferably a C language program that takes the X, Y, and time coordinates from the HTTP Server 33 (originally from the viewer 31), retrieves the appropriate VHL video map 35 and looks up the coordinate data on the map 35 to retrieve a URL address associated with the selection made by the user on the viewer 31.

The method by which the video map script 34 conducts this lookup operation can be appreciated by considering an example video map file, as follows. The map file is created manually using a MS Windows-based map making utility to assist in the file creation. The person originally making the map (the "map maker") navigates through a video using the play, step, rewind, etc. buttons, or using a frame number and go to button, to observe the moving objects that occur in the .AVI formatted video. When a video image appears during the course or range of frames, the map maker pauses the video and marks the locations on the video where hyperlinks will be recognized. Using a mapping utility, the assignment of these hyperlinks (also called hot spots) can be done simply by clicking on the various spots on the video image until all desired hot spots for all desired objects have been logged. Then, the map maker can advance to the next subject matter in the video to which hot spots are to be attached and continue the process.

Importantly, the utility does not alter the video data file itself, but instead creates a map file (which will ultimately be stored in map 35 of FIG. 3) which records the location of the hot spots for each frame of the video. The following is a sample map file for a video of a comet crossing the face of a moon:

| Frame 2 | | | | | | |
|---|---|---|---|---|---|---|
| Spot | 9 | 10 | 25 | 26 | 41 | moon.html |
| Spot | 17 | 18 | 19 | | | comet.html |
| Default | | | | | | default.html |
| Frame 4 | | | | | | |
| Spot | 9 | 10 | 25 | 26 | 41 | moon.html |
| Spot | 18 | 19 | 20 | | | comet.html |
| Default | | | | | | default.html |
| Frame 6 | | | | | | |
| Spot | 9 | 10 | 25 | 26 | 41 | moon.html |
| Spot | 19 | 20 | 21 | | | comet.html |
| Default | | | | | | default.html |
| (Etc.) | | | | | | |

In the above map file, as the comet moves every two frames, the hot spots associated with the comet change with it. This particular map maker has decided that the hot spots can accurately track the position of the comet on the screen if the hot spots change every two frames. The moon is not moving in this particular video and the remainder of the picture is simply space. Essentially what the above map file provides is a series of physical coordinates (hot spots) and URLs, grouped by frame number. The following key words appear in the above file:

Frame: marks the last frame for which the group that follows is valid.

Spot: marks the hot spot numbers for a particular object.

Default: marks a default URL if no file is specified for the hot spot selected.

The frame statement is in the following format: Frame frame-number, where "frame" is the word and "frame-number" is the last frame number to which the section following it is valid. Thus, for example, if the first frame statement is frame 5, then the arguments following that frame statement will be valid for frames 0–5. If the next frame statement is frame 15, then the arguments following frame 15 will be valid for frame 6 through 15.

Following the frame statement is a series of rect statements and one default statement. The rect and default statements specify the hot spots for the frames greater than the previous frame statement through the current frame-number. The rect statements take the format of: spot hot spots URL where "spot" is the word and the hot spots are the parameters that specify the one or more hot spots that will cause the particular URL to be selected. The hot spots can be X-Y coordinates or can be a series of pre-numbered rectangles, for example, each being 10×10 pixels in a grid that covers the video. In the example image map above, the embodiment of pre-numbered rectangles is utilized, as discussed in more detail below.

The default statement is in the format of: Default URL, where "Default" is the word and URL is the URL that is to be returned if none of the previous spot arguments are found. The above sample image map contains each of the above described statements. Lines 1, 5, and 9 are frame statements indicating that the hot spots are grouped into frames 0–2, 3–4, and 5–6. The three arguments following each of the frame groupings are, respectively, a spot argument for the moon image, a spot argument for the comet image, and a default statement. The map maker has identified that the moon during frame 0–2 is located in pixel blocks (10×10 pixels) 9, 10, 25, 26, and 41. If, during the frame 0–2, the user clicks in any one of those pixel blocks, the URL "moon.html" is to be sent to the HTTP Server. Similarly, if during frame 0–2 any pixel block 17, 18, or 19 is selected, the third line indicates that comet.html is to be sent.

As can be seen in lines 6 and 10, the pixels identifying the location of the moon do not change since the moon is not moving during advances in the video frames. On the other hand, the comet is moving one pixel block per every two frames. Thus, in frames 3 and 4, the comet occupies positions 18, 19 and 20, while in frames 5 and 6 the comet occupies pixel blocks 19, 20 and 21. The map maker has identified each of these pixel blocks as hot spots for the comet during the respectively described frame groups. If the user clicks on any hot spot other than those indicated by the "spot" statements, the default statement will be executed, returning the URL "space.html," in the sample image map described above.

The present invention is not limited to the above described map format, but may take any type of format in which the X, Y, and time coordinates can be identified for a particular URL. Thus, for example, the map may take the form of:

Frame frame number
Spot HTTP://URL 36, 37, 38, 52
Default HTTP://default.URL
(Etc.)

In this example, the hot spot identifiers are in the format of: spot URL hot spots. Many other different types of formats can also be utilized to identify the hot spots and time for particular URLs. What is important is that the script 34 be capable of retrieving the map 35 and running its program on the map data to be able to identify an assigned URL for a particular X/Y/time based hot spot. The script 34 is a C program designed to take the image map 35 and use the data contained in the map to identify which URL should be returned for a particular X/Y/time set of coordinates. As shown in FIG. 3, the video map script 34 receives the (x,y,t) data (the X, Y, and time coordinates) from the HTTP Server 33 for a particular hot spot selected by the user on the viewer 31. With the (x,y,t) data, the video map script 34 takes the "VHL data" received from the header of the .BTV file, uses it to look up the map 35 corresponding to that .BTV file. The video map script 34 then runs the (x,y,t) data through the map 35 to determine which URL should be returned to the HTTP Server 33 for issuance onto the internet (FIG. 1) to retrieve the next desired data file.

For example, suppose the BTV viewer 31 is playing a BTV file having a header of URL=HTTP://domain.com/script and a VHL=c:video.map. Furthermore, the video map located at the VHL location is the video map in the example described above. Then, when the user uses the browser 32 to run the BTV file, the browser 32 opens the viewer 31 and begins showing the video. If, during the third frame of the video showing, the user uses the computer pointing device to click on the comet in pixel box number 19, the viewer 31 sends the (x,y,t) information, including the VHL, the CGI URL, pixel box 19, and frame number 3 to the browser 32, which sends all of the information except the CGI URL to the HTTP Server 33 specified in the domain name portion of the CGI URL. The server runs the filename portion of the URL, which is the video map script 34.

The video map script 34 uses the VHL to locate the map 35 at the location of C:\video.map, downloads the map 35 and applies the (x,y,t) information to the map as follows: First, the video map script reads line 1 of the map and identifies that the first group of hot spots is valid only through frame #2. The video map script 34 then moves to line #5 to determine that the next group of frames is valid through frame #4 and thus recognizes that the current (x,y,t) data frame number (3) is within the range of frames from frame 3 through frame 4, thus making the arguments in lines 6, 7 and 8 valid for the current frame. The video map script 34 then reads line 6 to determine whether the current pixel block (19) falls within the "spot" command and recognizes that it does not. The script 34 then goes to line 7 where it recognizes that the line 7 "spot" command is valid for pixel 19 and therefore returns the assigned URL "comet.html" to the HTTP Server 33.

The HTTP Server 33 then issues the URL "comet.html" onto the internet (FIG. 1) to return the data file associated with the "comet.html" URL. When that data has been received, the HTTP Server 33 returns the data to the browser 32 which reads the MIME of the "comet.html" data and displays the data to the user either on its own screen or by opening another viewer (depending on the data MIME).

At the end of the above example, the user's screen will appear as in FIG. 4 in which the browser 32 is open and running the video on the viewer 31. Also on the screen will be the linked screen 43 which will be playing the "comet.html" display for the user via either the browser or another viewer.

Figure 7:
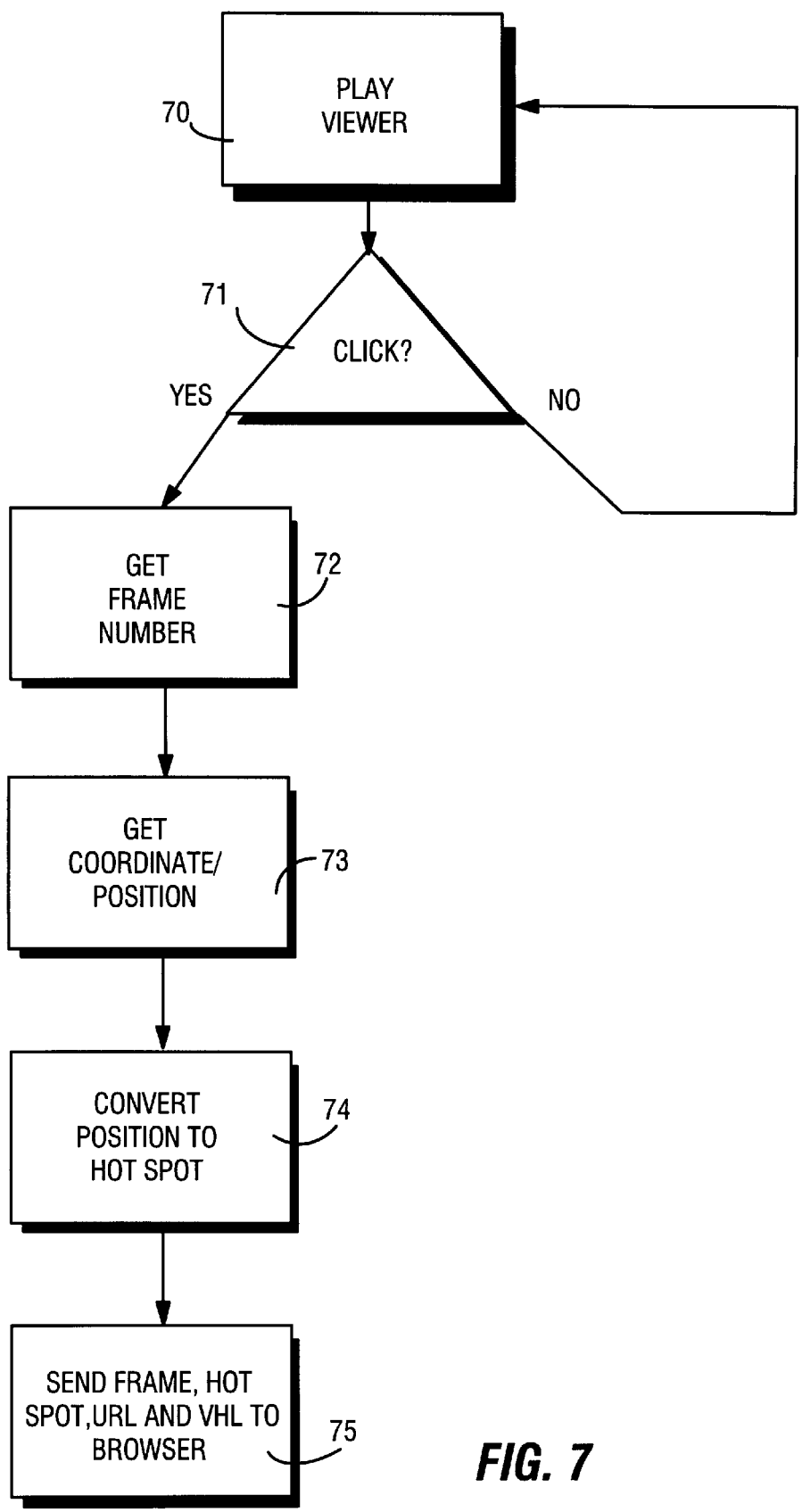
FIG. 7 is a flowchart of an example operation of the viewer of FIGS. 3–6.
Figure 8:
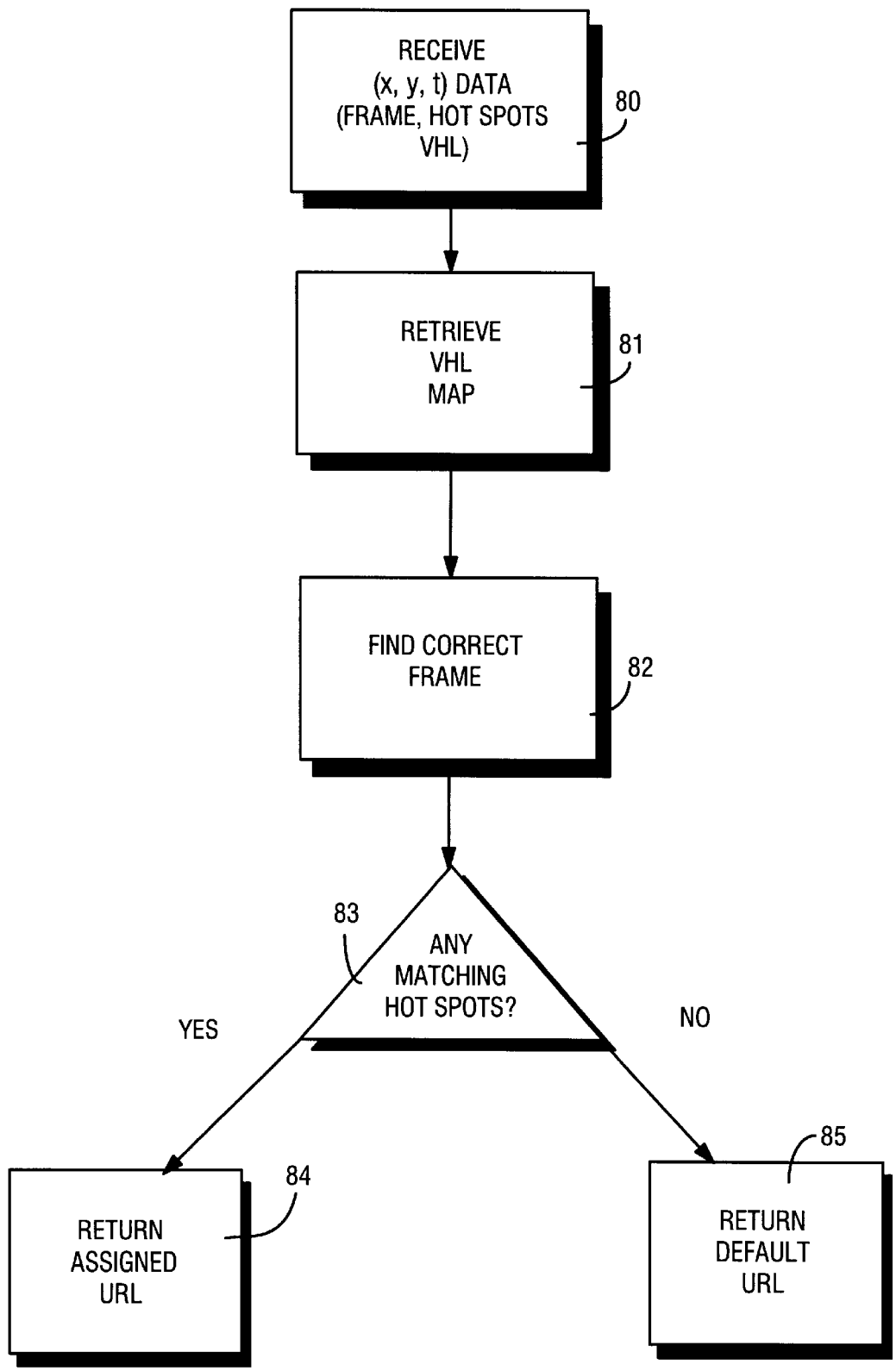
FIG. 8 is a flowchart of an example operation of the video script of FIGS. 3–6.

The flowcharts for the above-described operations of the viewers and script are shown in FIGS. 7 and 8. In FIG. 7, the operation of the viewer 31 is described and in FIG. 8, the operation of the script 34 is described. In FIG. 7, the viewer 31 is playing data given to it by the browser 32 at step 70. At step 71, the viewer 31 detects whether or not a user has clicked on the viewing screen with a computer pointer. If the user has not clicked on the screen, the viewer continues to play the data for the user at step 70. If at step 71, the viewer detects a click by the user, the viewer 31 records at step 72 the frame number of the video during which the click occurred. The viewer 31 then records the positional coordinates of the pointing device when the click occurred, all at step 73. If necessary, at step 74, the viewer 31 then converts the X, Y coordinate positions into a pixel block or a hot spot—alternatively, the viewer 31 can send the raw X-Y coordinate positions. It then sends the frame information, the hot spot information, the URL and VHL (from the .BTV header) to the browser 32, as shown as the "(x,y,t) data" in FIG. 3. The viewer must interface with the Application Program Interface (API) of the browser being used in such a way that it can communicate all of this information to the browser and server in order to get the next hyperlink. The API connection is platform and browser dependent. For example, on a Microsoft Windows platform, with a Netscape Navigator browser, either DDE (dynamic data exchange) or OLE (object linking and embedding) may be used.

Browser 32 then transfers the information to the HTTP Server 33 which transfers the information to the video map script 34, which operates in accordance with the chart shown in FIG. 8. The video map script 34 receives the (x,y,t) data (the frame, the hot spot and the VHL) at step 80. At step 81, the script 34 reads the VHL address and locates and retrieves the VHL map 35. At step 82, the video map script 34 reads the map and identifies the correct frame group for the frame number in the (x,y,t) data. At step 83, the video script 34 tests the hot spot locations to determine if any hot spot locations match the "spot" statements in the identified frame group of the image map. If matching hot spots are identified by the script 34, the assigned URL is returned to the HTTP Server 33 at step 84. If not, the video map script 34 returns the default URL to the HTTP Server 33 at step 85. The videomap script should follow the well-known rules for a CGI script, i.e., it must accept command line arguments from the server and respond with a file that the browser can understand, a filename, or a well-formed HTML page. The HTTP Server 33 then retrieves the data assigned to the returned URL from the internet (FIG. 1).

The data files returned by the HTTP Server can be a document, another video/audio, or some internet system capability (such as a Gopher menu, Telnet, a File Transfer Protocol, Usenet news, etc.).

As an alternative, the browser can return a map file alias to the Server, which will look up the actual map file in another file. This will allow the server to hide the actual location of the map file from the viewer and also to easily move the file if necessary.

Figure 5:
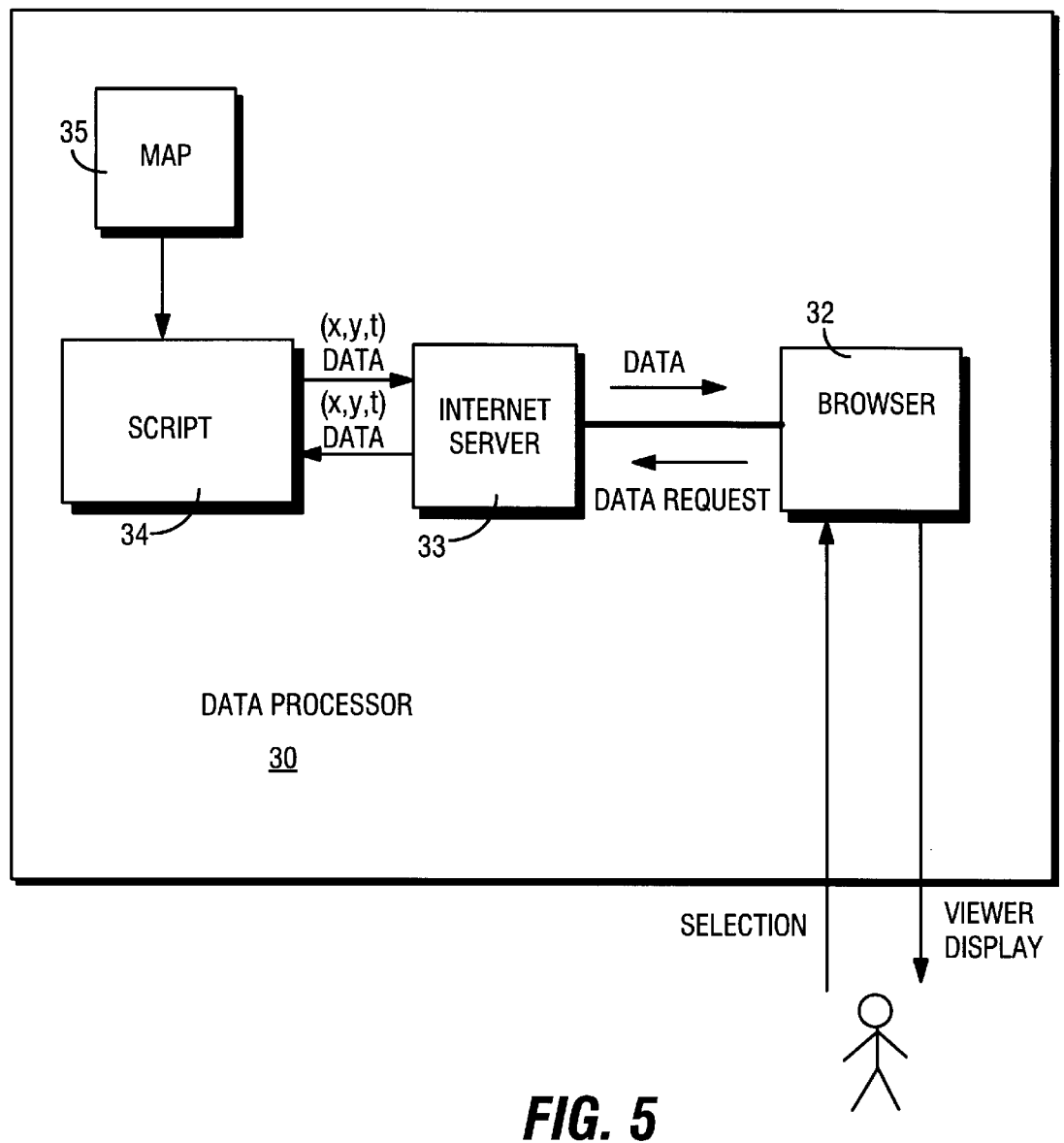
FIG. 5 is a schematic diagram of another embodiment of the present invention.
Figure 6:
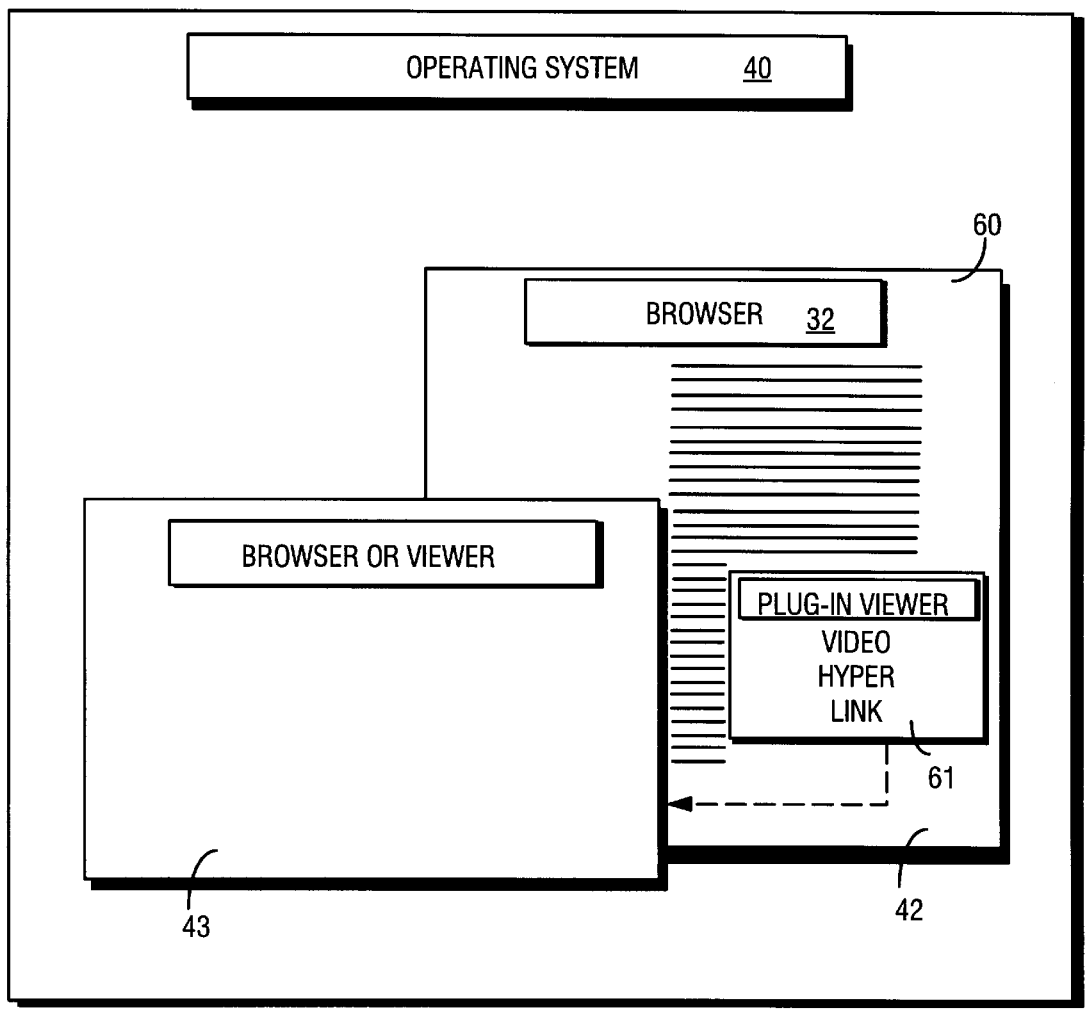
FIG. 6 is a schematic diagram of the operating system and video screen according to the embodiment of FIG. 5.

FIGS. 5 and 6 illustrate another embodiment of the present invention in which the functions of the viewer 31 are incorporated into the browser 32. As shown in FIG. 5, the hardware and software is identical to that shown in FIG. 3, except that the viewer 31 is omitted. All of the operations of the hardware and software in the embodiment of FIG. 5 are the same as that described in FIG. 3, with the following exceptions. In the embodiment of FIG. 5, the browser 32 includes the functionality of playing the full motion video (or other time-based data) on the browser screen 42 (FIG. 6). The user then makes his hyperlink selections directly on the browser 32, which then records the frame, coordinate, URL and VHL (from the .BTV header) information and returns it directly to the HTTP Server 33.

The operating system 40 (FIG. 6) is the same as is shown in FIG. 4. The browser 32 is operating in the operating system 40 and composes the browser screen 42 for the user. In the browser screen 42, a plug-in viewer 60 is being operated by the browser 32. The plug-in viewer 60 creates the plug-in screen 61 which plays the full motion video directly in the browser screen 42. In the plug-in screen 61, the hyperlinks are present, just as the hyperlinks were present for the videos played by the viewer 31 in FIG. 3. As a result, the user can click within the plug-in screen 61 on particular objects playing in the video on the screen 61, causing the browser 32 to record the (x,y,t) data for the particular click, send that data to the HTTP Server 33, which transfers it to the script 34, which pulls the appropriate map 35 and returns the corresponding URL to the HTTP Server 33. The HTTP Server 33 then obtains the data from the internet (FIG. 1) for the URL and returns that data to the browser 32, which opens screen 43 (FIG. 6) to display the returned data. Again, the screen 43 can be either another browser screen or could be a viewer screen.

An advantage of the embodiment of FIG. 5 over FIG. 3 is the memory space requirements. Since the viewer must separate the video from the header in the .btv format, the .btv file must be copied to a separate file for display in the embodiment of FIG. 3. On the other hand, the plug-in embodiment of FIG. 5 has no such requirement.

FIG. 9 illustrates a utility for converting a standard video file into a .BTV file. As described previously, the .BTV file is simply a .AVI file (or similar video file) with an associated header. The information for the header is shown in FIG. 9 and includes three mandatory pieces of information: the "CGI URL" (the URL where the HTTP Server 33 can find the video map script 34), the "map location" (the file path where the script 34 can find the map 35), and the "AVI file" (the location of the original, unaltered video file in the .AVI MIME format).

The header may also include a number of options, as shown in FIG. 9. If these options are selected, appropriate command lines will be inserted into the .BTV header between the "START" and "END" statements in the example BTV header described above. The options include permitting the local user to pause or stop. With this option, the viewer can allow the user to pause the video, or prevent him from doing so. The options also include starting the video immediately upon receipt, or waiting until the user presses the "play" button. Another option specifies whether the video will pause or continue after a click. There are also options for the viewer to ignore clicks (such as to sample the number of clicks that are received), and to store and send the (x,y,t) data after any number of clicks designated. Storing a number of clicks allows the user to save several clicks and return them in one response, or to return each click as it is received. The viewer can disallow commands such as saving video files or pausing video playings. This may be valuable for transmitting copyrighted information or for giving tests. The BTV options can also include different looping options for the video, which tell the viewer whether and how to loop the video at the end of a video playing. Finally, a new viewer can be started each time a new video file is retrieved, or the same viewer can stop one video to play a subsequent one. The present invention is not limited to the above-listed options and other options or lesser options will be recognized by those skilled in the art.

The present invention is valuable in a number of different contexts, only a few of which are now described.

Shopping over the Internet: A video clip (with sound) of sale items can be displayed first by describing categories of products or services. When one is selected, items in that category can be shown in a follow-up clip of video cascading menus. An example could be in the context of resort rentals. An introductory movie could show a fly-by of the resort area, with available houses having the rental agent's logo on the roof. When a user is interested in a house, he could click on the house and receive either a static page or a walkthrough video describing that house. There may also be overlaid "buttons" on the screen that a user could select at any time. One button may say "show neighborhood" which would bring up a page, a series of pages, or a custom movie, showing all houses in the neighborhood on the screen.

Contests: Contests are a good way for businesses to attract attention and possible buyers. There are many ways to adapt the video hyperlink mechanisms to contests.

One example is to intersperse a promotional video with a series of brief appearances by an animated mascot. The viewer must click on for example, the mascot's waving arm each time it appears. The clicks are sent back to an alternate video map script, which does not return a page but instead stores a record of how accurate the user was, along with the name, address, etc. information. The winner is the most accurate customer.

Timed Examinations: Some tests, such as psychological tests, require that a person respond quickly, and not think about the answers. A test (spoken or textual) could be presented on screen and the viewer given an appropriate time to answer before the next question is presented.

Other tests that may benefit from timed responses include:
  Intelligence tests
  Spatial skills tests (selecting a certain feature in an engineering drawing)
  Memory tests (show a scene, followed by a slightly different scene, and ask the user to find the difference)
  Observation skills tests (show a clip, then ask questions about the clip)

There are many related uses in education, especially in improving skills tested in the previous list.

Video Assistance: The present invention would be ideal for walking a user through a form or menu. Currently, lengthy text is needed to fully explain each item in a menu in order to keep a user from getting lost. Sometimes long labels need to be associated with each item in a form, to prevent wrong information from being entered. This could be replaced with a short video explaining the choices, along with hot spots on the possible choices. The user could select a hot spot at any time, which would stop the video and perhaps start the download of the next one, based on his previous choice.

This might be implemented as an adjunct to current menus or forms, via a "Novice" link on the HTML page, so an experienced user would not have to download videos. The Novice link could appear in several places, so an experienced user who needs help in a specific place can use the video assistance. This could be used anywhere an existing menu or form is used. It could also be used for new services, such as an on-line stock market assistant. It has a multitude of uses within a hotel setting, although with a different interface (video remote control, rather than a computer pointing device):
  as an adjunct to video on demand
  as an assistant with video checkout
  as a hotel services directory, possibly with a telephone tie-in, e.g., someone selects the "Concierge" and the concierge is notified and a phone link is made to show local maps of restaurants, special events, etc.

Handyman Helper: This is a promising tool for someone doing a variety of construction tasks, such as home construction or woodworking. Here's an example of how a building project might be implemented:

To start, a bill of materials and engineering drawings might be shown on a standard HTML page.
  A VideoHyperlink would download a walkaround of the finished project, or, for a complex project, a series of walkarounds after different phases of the project. By using walkarounds, rather than a slideshow, the viewer can keep track of what part of the finished product he is seeing.
  The user could pause the video to examine details of the construction and hyperlinks would be embedded at any complex joints or unusual details, that the user could select to get additional details on an HTML page. This might include details on a particular technique, or a pattern for a woodcarving.

Beyond Netscape: Video Hyperlinks can stand alone, for many applications. A good example is in the construction manual, shown above. A pre-packaged video and a modified viewer could walk a user through the construction, using the same hyperlinks as above, but using them to jump to other portions of the video, or to other local video clips. For a large project, or for other training materials, the videos and viewer would be delivered on a CD-ROM.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A video viewer for use by a user on a data processor having a video screen, the data processor communicating on a network via a network server, comprising:
  a video player application to play a video data set of a plurality of video frames on the video screen, including,
  a header application to read a header associated with the video data set to identify a video map address on the network corresponding to the video data playing on the video screen, the video map address identifying a video map including:
    a plurality of frame groups each including:
      data identifying a set of video frames from the video data playing on the video screen,
      a set of physical coordinates on said video screen corresponding to a portion of the video data in the set of video frames, and
      a network address corresponding to the set of physical coordinates; and
  a recording application to record, when prompted on the video screen by the user during the playing of the video frames of the video data set and independent of the content of the video frames when the prompt occurs, coordinate data including data identifying where said prompt occurred on the video screen and when said prompt occurred on the video screen; and
  a communication application to 1) communicate the recorded coordinate data and the video map address to the network server, and 2) receive and display data returned by the network server in response to the recorded coordinate data and the video map address.

2. A video viewer as in claim 1, further including:
a browser application for communicating with the network server and for translating information received from the network server into a pattern on the video screen.

3. A video viewer as in claim 1, wherein the prompts are received from a computer pointing device identifying HTML-formatted hyperlinks.

4. A video viewer as in claim 1 further including:
a script application 1) for looking up the recorded coordinate data on the map file and 2) for issuing to the network server, based on the look-up, a network address corresponding to the recorded coordinate data.

5. A video viewer as in claim 1, wherein the video map is located in the data processor.

6. A video data set for use on a network browser running on a data processor having memory and a video screen and communicating on a network, comprising:
video information for loading into the memory for display on the network browser; and
an address header identifying a location on the network of a map file corresponding to the video information, said map file comprising:
a plurality of frame groups each including:
data identifying a set of video frames from the video information,
a set of physical coordinates corresponding to a portion of the video information in tie set of video frames, and
a network address corresponding to the set of physical coordinates to be returned to the network browser via the network after receipt from the network browser of data determined independently of the content of the video information and identifying the occurrence of a user prompt within the corresponding set of physical coordinates of the corresponding set of video frames.

7. A video data set as in claim 6, wherein the address header further includes a location of a script to read the map file and to coordinate a set of physical coordinates and a video frame with said frame groups in said map file.

8. A video data set as in claim 6, wherein at least one frame group includes a plurality of sets of physical coordinates on said video screen corresponding to a plurality of portions of the video information in the set of video frames.

9. A data processing system for a user, having a microprocessor, memory, and a video screen, the system for communicating on a network of devices having associated device addresses and using a network language to hyperlink between said devices, comprising;
a network server, in electrical communication with the network to 1) deliver device addresses onto the network and 2) accept data from said network in response to the delivered device addresses;
a file server, in electrical communication with the network server, containing, at a map file address, a map file for a video data set, including:
a plurality of frame groups each including:
data identifying a set of video frames,
a set of physical coordinates identifying locations where said hyperlinks reside for the set of video frames, and
a device address corresponding to the set of physical coordinates;
a browser application, run by the microprocessor, to translate said network language into a pattern on said video screen;
a viewer application, run by the microprocessor, in communication with said browser application to 1) display the video data set on the video screen, 2) read the map file address from said video data, 3) when prompted by said user, record coordinate data including physical coordinates on the video screen where the prompt occurred and a time coordinate when the prompt occurred, and 4) return the recorded coordinate data and the map file address to the network server;
a script application, called by the browser application, to 1) receive the map file and recorded coordinate data, and 2) return a device address from said map file based on the recorded coordinate data to the network server;
whereby the network server delivers to the network the device address received from the script application, and receives from the network and delivers to the browser the data corresponding to the device address received from the script application, and
whereby the browser translates the data corresponding to the device address from said map file into a pattern on said video screen.

10. A system according to claim 9, wherein the viewer application also returns a device address associated with said script application.

11. A system according to claim 10, wherein the script application resides on a different device address than does the viewer application.

12. A system according to claim 9, wherein the viewer application and the browser application are combined into a single application.

13. A system according to claim 9, wherein the script application retrieves the map from the file server.

14. A system according to claim 9, wherein the browser uses another viewer application to display the data corresponding to the device address from said map file into a pattern on the video screen.

15. A system according to claim 9, wherein the map file address read by the viewer application is an alias used by the network server to obtain the map file received by the script application.

16. A network browser for use with a user input device, comprising:
a video viewer for identifying and retrieving a set of video frames from a network and for providing a set of said video frames for display on a video display screen;
a user input controller for receiving user inputs from said user input device identifying coordinate data on said video display screen where prompts were entered by said user input device;
a time monitor for determining time locations in said set of video frames when said prompts were entered by said user input device; and
a communication link for communicating the coordinate data and the time locations for said prompts to a network server together with a video map address at which the network server can find on the network a video map corresponding to the set of video frames, which video map provides script information to identify frames and locations on said frames at which the prompts occurred, said video map remaining unknown to the network browser, said communication link also for communicating from said network server to said browser response addresses derived from said script information.

17. A browser according to claim 16, wherein:

said video map identifies:
1) a plurality of frame number sequences,
2) hot spot locations of frames corresponding to said frame number sequences, and
3) said browser response addresses corresponding to said hot spot locations.

18. A browser according to claim 17, wherein:

the video viewer retrieves the video map address from a header of said set of video frames.

19. A browser according to claim 18, wherein:

the communication link communicates only a single video map address per corresponding set of said video frames for display.

20. A browser according to claim 19, wherein:

the communication link communicates said single video map address every time said communication link communicates coordinate data associated with said video frames for display.

* * * * *